(12) United States Patent
Yeh

(10) Patent No.: US 7,273,225 B2
(45) Date of Patent: Sep. 25, 2007

(54) REVERSIBLE BABY STROLLER WITH BRAKE STRUCTURE

(75) Inventor: Chuan-Ming Yeh, Chia Tai Industrial Tai Pao (TW)

(73) Assignee: Link Treasure Limited, Chia Tai Industrial Tai Pao (TW)

( * ) Notice: Subject to any disclaimer, the term of this patent is extended or adjusted under 35 U.S.C. 154(b) by 0 days.

(21) Appl. No.: 11/162,876

(22) Filed: Sep. 27, 2005

(65) Prior Publication Data

US 2006/0071452 A1    Apr. 6, 2006

(30) Foreign Application Priority Data

Oct. 5, 2004    (TW) ............................... 93215766 U

(51) Int. Cl.
    *B62B 7/08*    (2006.01)
(52) U.S. Cl. ..................... 280/648; 280/641; 280/38; 280/639; 280/638
(58) Field of Classification Search ............... 280/642, 280/641, 38, 639, 638, 648
    See application file for complete search history.

(56) References Cited

U.S. PATENT DOCUMENTS

| | | | | | |
|---|---|---|---|---|---|
| 1,861,958 | A | * | 6/1932 | Gallinant | 188/20 |
| 5,645,293 | A | * | 7/1997 | Cheng | 280/642 |
| 5,845,924 | A | * | 12/1998 | Huang | 280/642 |
| 6,102,432 | A | * | 8/2000 | Cheng | 280/642 |
| 6,298,949 | B1 | * | 10/2001 | Yang et al. | 188/20 |
| 6,378,663 | B1 | * | 4/2002 | Lee | 188/2 F |
| 6,443,468 | B1 | * | 9/2002 | Eros | 280/47.38 |
| 6,508,605 | B1 | * | 1/2003 | Cheng | 403/83 |

* cited by examiner

*Primary Examiner*—Christopher P. Ellis
*Assistant Examiner*—Cynthia F. Collado
(74) *Attorney, Agent, or Firm*—Alan Kamrath; Kamrath & Associates PA

(57) ABSTRACT

A reversible baby stroller with a brake structure includes a handlebar having an actuated member. The flexible wire is connected between said actuated member and either the front or the rear of the brake mechanism. The said actuated member, therefore, can control the brake mechanism. When the user requires changing the position of the handlebar, the actuated member moves along the handlebar. Further, whether the handlebar is in the front or in the rear, the user uses the said actuated member through the flexible wire to operate the brake mechanism for achieving convenience.

14 Claims, 6 Drawing Sheets

REVERSIBLE BABY STROLLER WITH BRAKE STRUCTURE

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of Invention

The scope of the present invention relates to a reversible baby stroller with a brake structure. The frame of the baby stroller has a reversible handlebar. The handlebar has an actuated member, with the actuated member connected to the brake mechanism through a flexible wire. Further, whether the handlebar is in the position of the front or the rear, the user can use the actuated member to control the brake mechanism.

2. Background

The conventional baby stroller usually has a handlebar for the user to push. The fixed type handlebar is positioned behind the rear of the frame seat in the baby stroller, and is convient for the user to push the baby stroller from the rear. Further, the rear legs have a brake apparatus. The brake apparatus is positioned on the lower side of the handlebar, which can be controlled for movement and to stop the baby stroller. Since the fixed type handlebar is pushed by the user from the rear of the seat, the baby cannot see the user and feels insecure and unstable.

Some baby strollers use a reversible handlebar. The handlebar is jointed on the frame and selectively fixed so the user either faces or is in back of the baby for further pushing the baby stroller. However, when the handlebar is changed to face the baby as a pushing position, the user is required to choose another side to operate the brake apparatus and has more trouble in operation. This is because the original brake apparatus is positioned on the lower side of rear leg. In order to overcome the above problem, some of the front wheel sets have the brake apparatus. However, this method is not only a waste, but also causes confusion and inconvenience to the user. Similarly, the user can not recognize which set has already been released or is in the brake status.

According to the above mentioned descriptions, the conventional reversible baby stroller with a brake structure has an inconvenient operation and expensive cost. The present invention relating to a reversible baby stroller with a brake structure can overcome the above disadvantages. The handlebar in the present invention has an actuated member. The flexible wire is connected between the actuated member and either front or rear brake mechanism, and said actuated member can control the brake mechanism as well as select the baby stroller in either movement or stop status. The actuated member and the flexible wire are both positioned on the handlebar. Therefore, the actuated member moves along the handlebar when the user changes the direction of the handlebar. Further, the user can operate the actuated member through the flexible wire to drive the brake mechanism as well as to achieve convenience.

BRIEF DESCRIPTION OF THE DRAWINGS

These and other modifications and advantages will become even more apparent from the following detailed description of a preferred embodiment of the invention and from the drawings in which.

DETAILED DESCRIPTION OF THE INVENTION (PREFERRED EMBODIMENTS)

Figure 1:
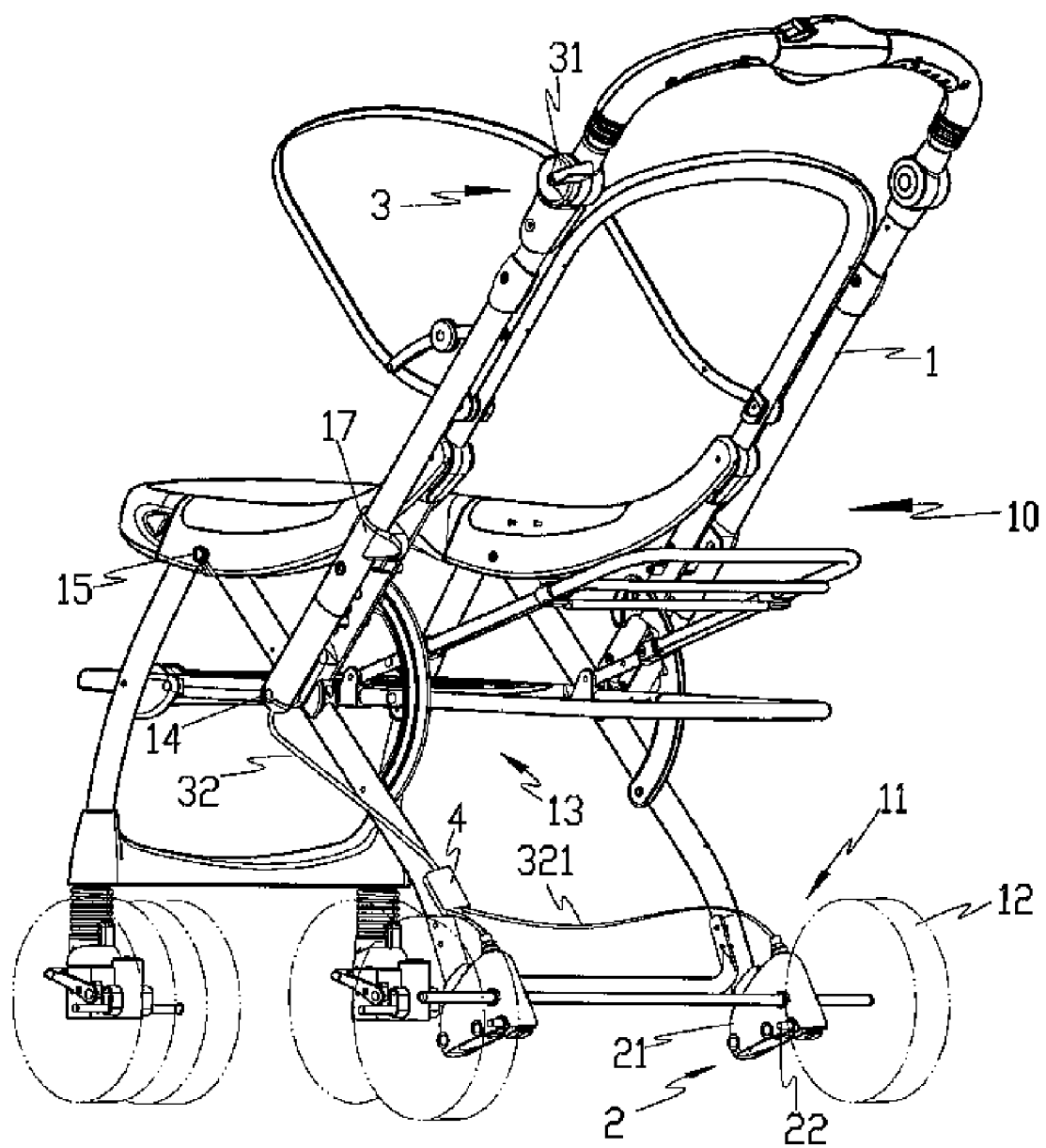
FIG. 1 is a perspective diagram of the present invention.
Figure 2:
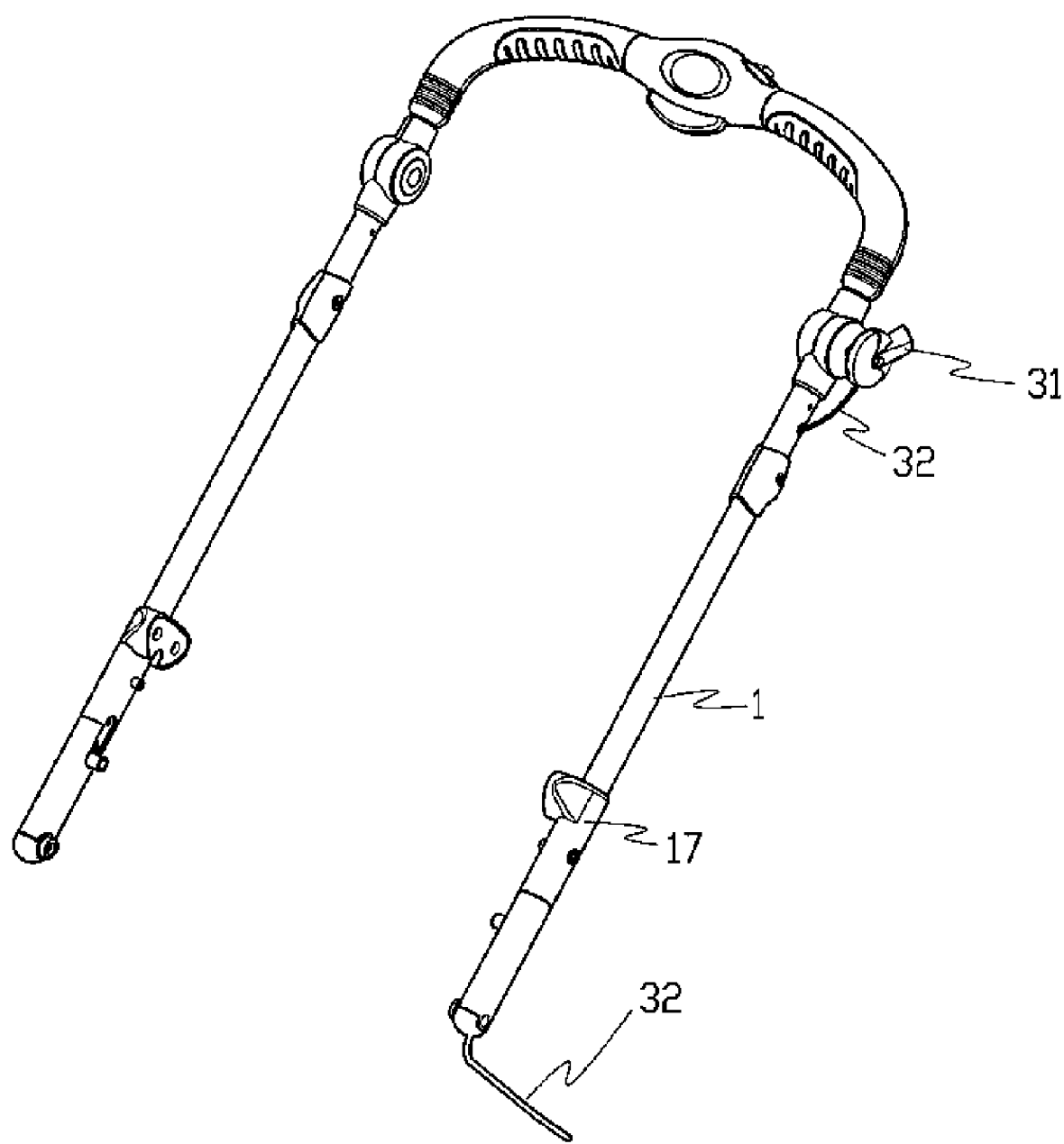
FIG. 2 is an assembly diagram showing handlebar and driving mechanisms of the present invention.

Please refer to FIG. 1 and FIG. 2. The present invention relates to a reversible baby stroller with a brake structure. The present invention mainly provides that the user can change the direction of the handlebar (1) either in the front or in the rear of the baby stroller as well as control the same brake mechanism on the handlebar. The present invention comprises a frame of the baby stroller (10), a brake mechanism (2), and a driving mechanism (3).

Figure 5:
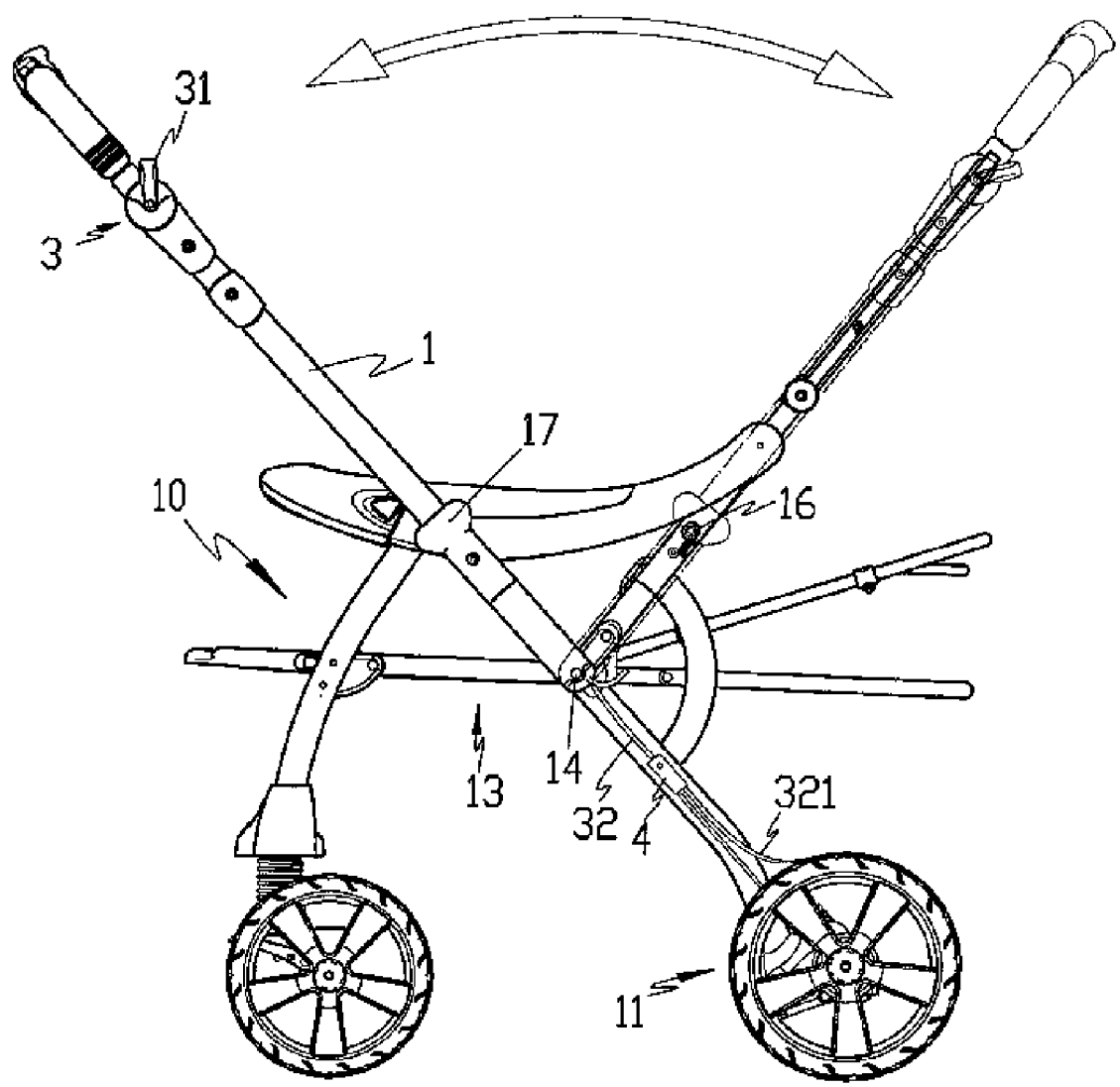
FIG. 5 is a side view showing the direction change of the handlebar movement.

The above mentioned frame of the baby stroller (10) includes multiple tubes, and the wheel set (11) is joined with wheels (12) for movement. The baby stroller (10) also includes a seat portion (13) for a baby to sit. Further, the frame of the baby stroller (10) includes a joint portion (14), a front positioning portion (15), a rear positioning portion (16), and a handlebar (1). Please refer to FIG. 5. The handlebar (1) has a reversible sleeve (17). The end of the reversible sleeve (17) is joined with the joint portion (14) of the frame of the baby stroller (10). The reversible sleeve (17) can be locked on either the front positioning portion (15) or the rear positioning portion (16) for positioning. Therefore, the handlebar (1) rotates and positions in either the front or the rear by the joint portion (14). Further, it can provide the user to choose either to face or to back of the baby to push the baby stroller (10) for convenience.

Figure 3:
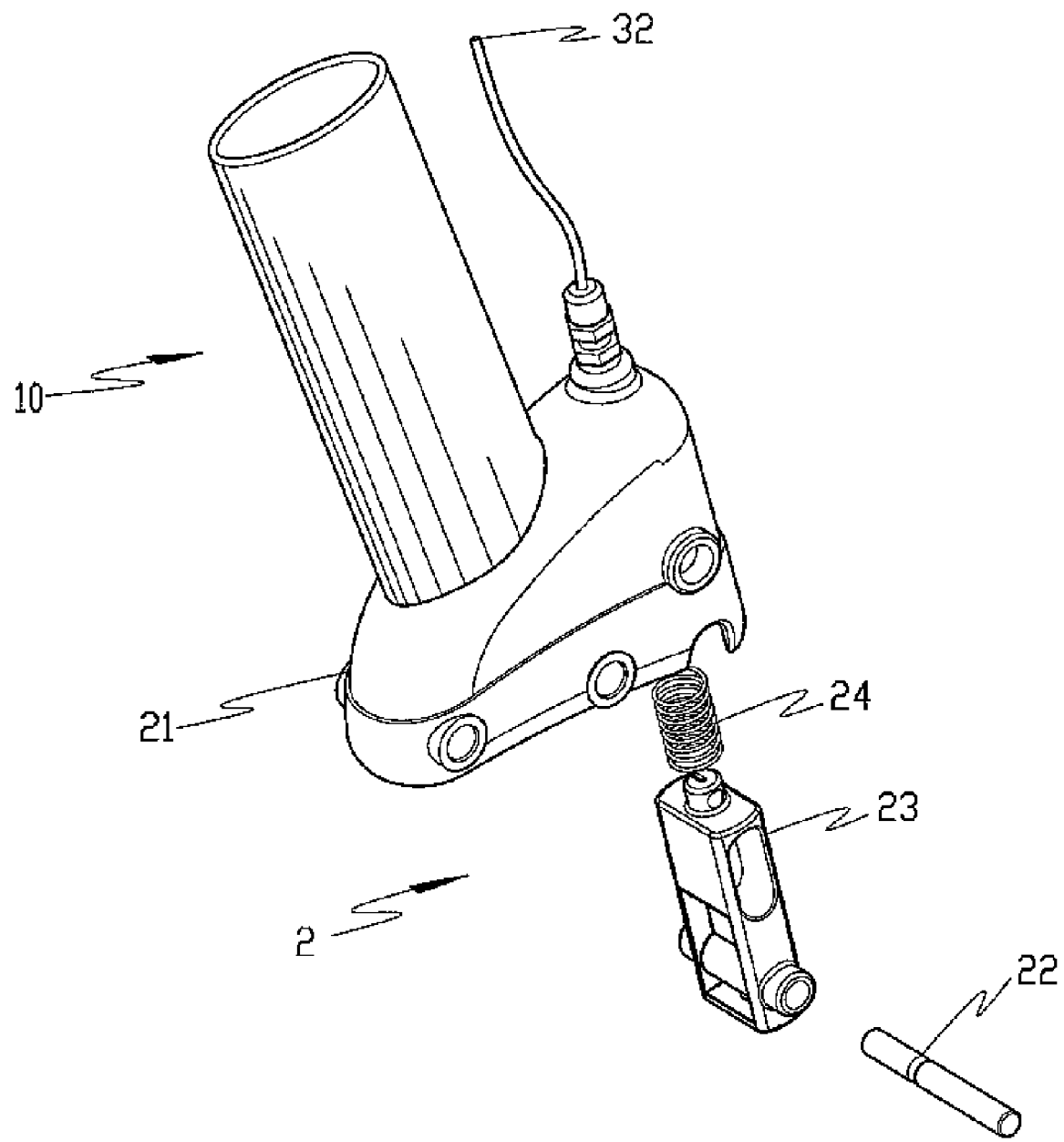
FIG. 3 is an exploded perspective diagram showing components of the brake structure in the present invention.

Please refer to FIG. 3. The brake mechanism (2) is positioned on the wheel set (11) in the lower side of the frame in the baby stroller (10) and can control braking of the wheel (12). In the present preferred embodiment, the brake mechanism (2) includes a wheel base (21), a brakebar (22), and a slider (23). The slider (23) is inside the wheel base (21) and also can slide inside the wheel base (21). The brake rod (22) is penetrated through the slider (23) and moves along the slider (23). The position of the brakebar (22) is changed and forms a lock with the wheel (12) and can prevent the wheel (12) from rotating. An elastic member (24) is positioned between the slider (23) and the wheel base (21). By using the elastic member (24), the slider (23) and the brakebar (22) can return to the released position which is not in contact with the wheel (12). Further, the brake mechanism (2) also can use a brake pad (not shown in the figure). The friction of the contact between the brake pad and wheel (12) makes the speed of the wheel (12) to slow down or stop.

Figure 4:
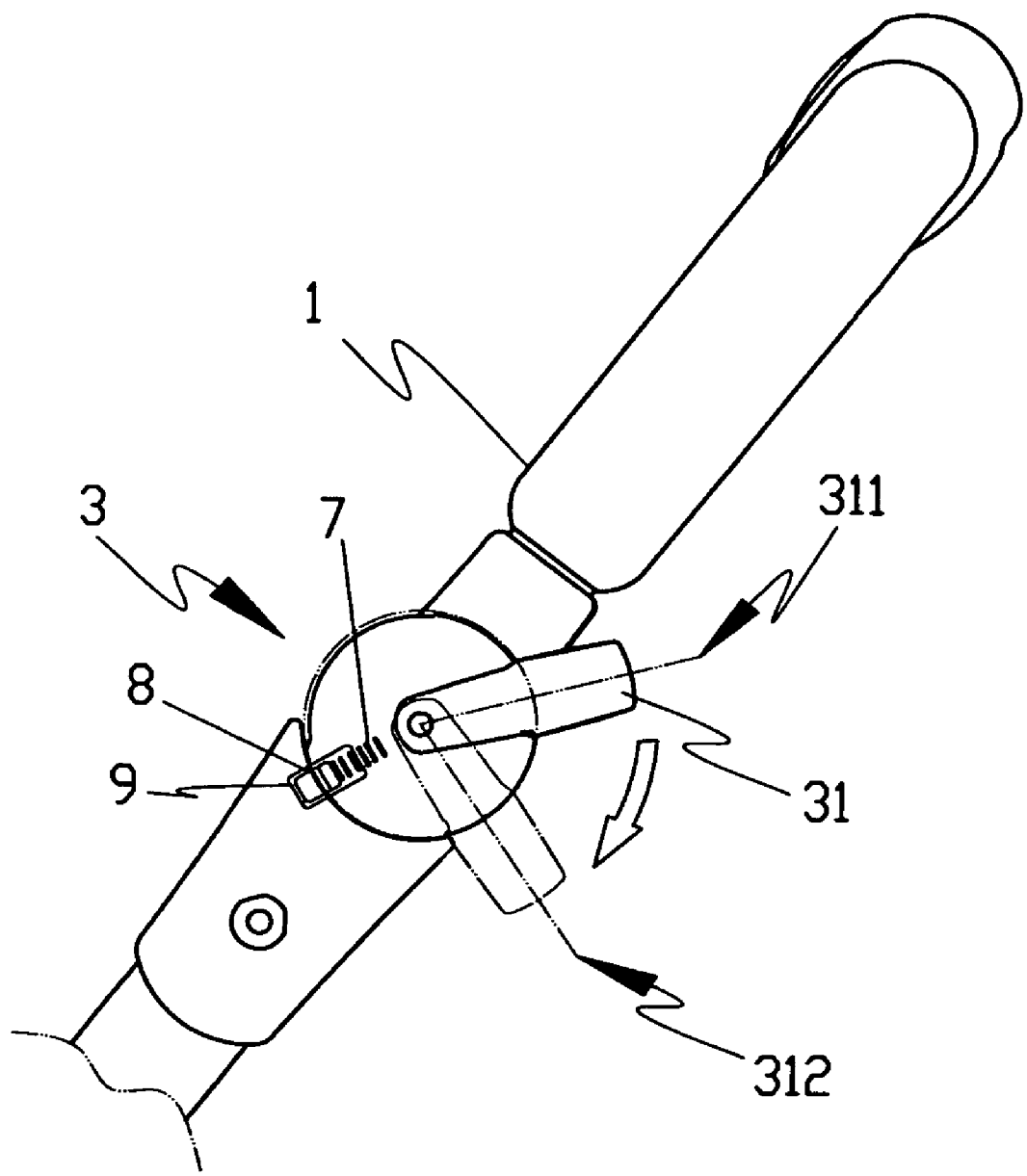
FIG. 4 is a partial side view showing components of the actuated member in the present invention.

Please refer to FIG. 4. The brake mechanism (2) can be controlled by a driving mechanism (3). The driving mechanism (3) includes an actuated member (31) and a flexible wire (32). In the present preferred embodiment, the actuated member (31) is positioned on one side of the handlebar (1) as well as joined with the handlebar (1). The user can switch to either a positioning location (311) or a released location (312). Please refer to FIG. 4. In the present preferred embodiment, the positioning location (311) in the actuated member (31) has a lock portion (8). The handlebar (1) has a positioning portion (9). When said actuated member (31) rotates to the positioning location (311), said lock portion (8) uses a spring (7) to push into the positioning portion (9) for said actuated member (31) to remain at the positioning location (311). When the lock portion (8) is away from the positioning portion (9), the actuated member (31) again returns to the released location (312).

Figure 6:
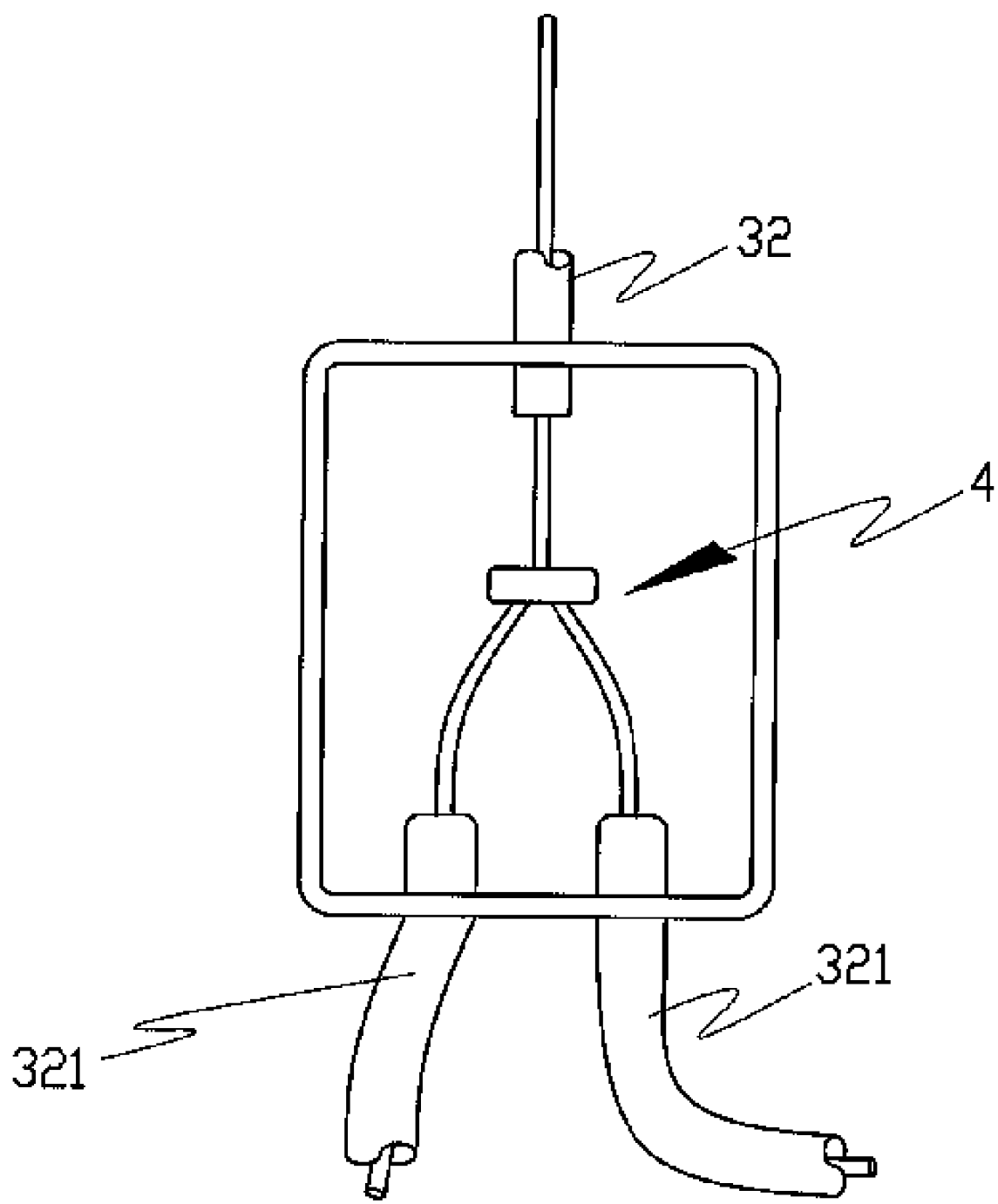
FIG. 6 is a side view showing a transferred junction of the present invention.

Please refer to FIG. 6. The above mentioned flexible wire (32) is positioned between the actuated member (31) and the brake mechanism (2). In the present preferred embodiment, the flexible wire (32) is positioned on the inside of the handlebar (1). Further, both ends are individually connected between the actuated member (31) and the slider (23) or the brake pad. The rotation of said actuated member (31) through the flexible wire (32) can drive the brakebar (22) to move. Further, the brakebar (22) can either limit the movement or release the wheel (12). In the present preferred embodiment, the flexible wire (32) is extended to the downside in the inside of the handlebar (1) through the single side of the baby stroller (10). Further, it is connected with a transferred junction (4), and said transferred junction (4) has two flexible branch wires (321) individually connecting with the brake mechanism (2) in both sides. The actuated member (31) also can be positioned in between the handlebar (1) (not shown in the Figure). Further, the flexible wires (32) can extend alone both sides and said pair of flexible wires (32) are individually connected with the brake mechanism (2).

According to the above mentioned components, the user can select the handlebar (1) positioning either in the front positioning portion (15) or in the rear positioning portion (16) for either facing or being behind the baby and pushing the handlebar (1) to move the frame of the baby stroller (10). Since the actuated member (31) is positioned on the handlebar (1) and the flexible wire (32) is along the handlebar (1), the said actuated member (31) and the flexible wire (32) move along the handlebar (1) but do not affect the brake function. When the user wants to brake, the actuated member (31) is first pulled. When the brakebar (22) or the brake pad are pulled through the flexible wire (32), either said brakebar (22) or the brake pad makes the brake on the wheel (12). The said actuated member (31) is positioned in the positioning location (311) as well as being fixed, and the said brakebar (22) makes the wheel remain in the brake status. For releasing, the actuated member (31) is also pulled to the released position (312). Further, the elastic member (24) assists the brakebar (22) or the brake pad to release the limitation on the wheel (12).

It will be appreciated that, although a specific embodiment of the invention has been described herein for purposes of illustration, various modifications may be made without departing from the spirit and scope of the invention. Accordingly, the invention is not limited except as by the appended claims.

What is claimed is:

1. A reversible baby stroller with a brake structure comprising:
    a frame including a joint portion;
    wheel sets on the frame for providing mobility;
    a seat portion carried by the frame;
    a reversing direction handlebar pivotably mounted on the joint portion for movement between a front position and a rear position, with the reversing direction handlebar located in front of the seat portion in the front position for pushing the frame in a first direction and with the reversing direction handlebar located behind the seat portion in the rear position for pushing the frame opposite to the first direction;
    a brake mechanism located on at least one wheel set; and
    a driving structure comprising;
    a flexible wire extending between said handlebar and said brake mechanism; one end of the flexible wire connecting with the brake mechanism of said wheel set for transferring energy so as to actuate said brake mechanism; and
    an actuated member pivotal on said handlebar; said actuated member connecting with another end of said flexible wire; with movement of said actuated member actuating said brake mechanism through said flexible wire to brake said wheel set.

2. The reversible baby stroller with a brake structure as claimed in claim 1, wherein said flexible wire is connected with said brake mechanism along the handlebar.

3. The reversible baby stroller with a brake structure as claimed in claim 2, wherein said flexible wire is positioned in the inside of said handlebar.

4. The reversible baby stroller with a brake structure as claimed in claim 1, wherein said actuated member includes a positioning location and a released location, with the actuated member remaining at a brake status in said positioning location.

5. The reversible baby stroller with a brake structure as claimed in claim 4, wherein said actuated member includes a lock portion and can lock with said handlebar to form said positioning location.

6. The reversible baby stroller with a brake structure as claimed in claim 5, wherein said lock portion is moved by a spring and is locked with said handlebar to form said positioning location.

7. The reversible baby stroller with a brake structure as claimed in claim 5, wherein the lock portion of said actuated member is locked with a positioning portion of said handlebar to form said positioning location.

8. The reversible baby stroller with a brake structure as claimed in claim 1, wherein said flexible wire is connected to both sides of said handlebar to said brake mechanism.

9. The reversible baby stroller with a brake structure as claimed in claim 1, wherein said flexible wire is extended down along a single side of said handlebar, with two flexible branch wires individually connected with both sides of the brake mechanism through a transferred junction.

10. The reversible baby stroller with a brake structure as claimed in claim 1, wherein said brake mechanism includes a wheel base, a slider, and a brakebar, wherein said slider is positioned inside of said wheel set and penetrated by and connected with said brakebar, wherein said slider can move inside of said wheel base and drives said brakebar to said wheel set for a lock, with an elastic member returning the slider to the released location.

11. The reversible baby stroller with a brake structure as claimed in claim 10, wherein said slider is connected with the one end of said flexible wire, wherein said flexible wire drives said slider to move with said brakebar.

12. The reversible baby stroller with a brake structure as claimed in claim 1, wherein said brake mechanism is a brake pad, wherein friction of contact between said brake pad and said wheel set makes the wheel set to slow down or stop.

13. The reversible baby stroller with a brake structure as claimed in claim 11, with the wheel set including a wheel having an outer periphery for rolling on a support surface, with the brakebar engaging with the outer periphery of the wheel.

14. The reversible baby stroller with a brake structure as claimed in claim 11, with the wheel set including a wheel having an axle extending through the wheel base and through the slider, with the slider being slideable upon the axle.

* * * * *